United States Patent [19]
Baker et al.

[11] 3,946,311

[45] Mar. 23, 1976

[54] AIR CORE GAUGE WITH EXPANDED POINTER RANGE

[75] Inventors: John D. Baker, Lisle; Bryce W. Carus, Grayslake, both of Ill.

[73] Assignee: Stewart-Warner Corporation, Chicago, Ill.

[22] Filed: Apr. 29, 1974

[21] Appl. No.: 465,324

Related U.S. Application Data

[63] Continuation-in-part of Ser. No. 368,502, June 11, 1973, abandoned.

[52] U.S. Cl. ............................. 324/167; 324/140 R
[51] Int. Cl.² ...................... G01P 3/48; G01R 7/00
[58] Field of Search .......................... 324/166–170, 324/173, 174, 175, 140 R, 146

[56] References Cited
UNITED STATES PATENTS

| | | |
|---|---|---|
| 3,602,811 | 8/1971 | Fales .................................. 324/169 |
| 3,636,447 | 1/1972 | Gelenius ........................ 324/140 R |
| 3,694,750 | 9/1972 | Schuhrke .............................. 324/173 |

*Primary Examiner*—Alfred E. Smith
*Assistant Examiner*—Rolf Hille

[57] ABSTRACT

An air core gauge is provided with a plurality of angularly oriented coils. Switching means are connected to the coils in order to control the flow of current therethrough. Pulse generators responsive to variations in frequency of electrical signals representative of a condition, such as vehicle speed or engine RPM, control the switching means so as to cause excitation of the coils to produce a resultant mmf vector, the angular position of which is related to the frequency of the signals. The resultant mmf vector causes a magnet and associated pointer to rotate to thereby provide an indication of the value of the condition.

31 Claims, 18 Drawing Figures

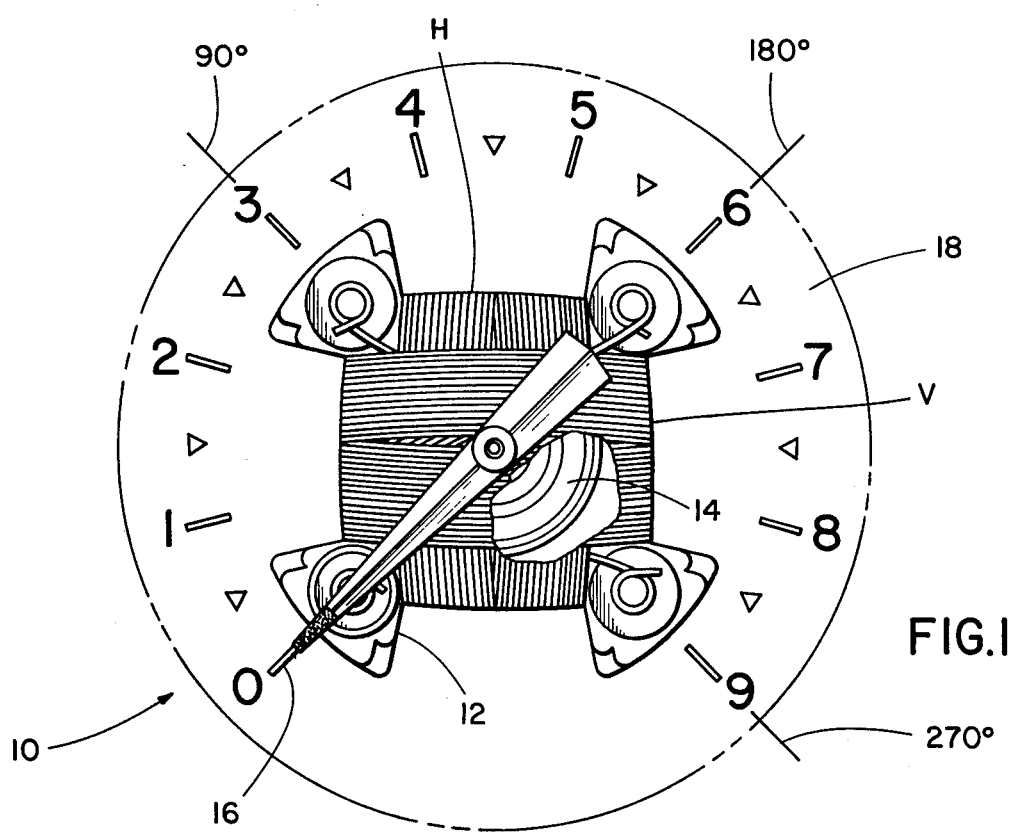
FIG.1
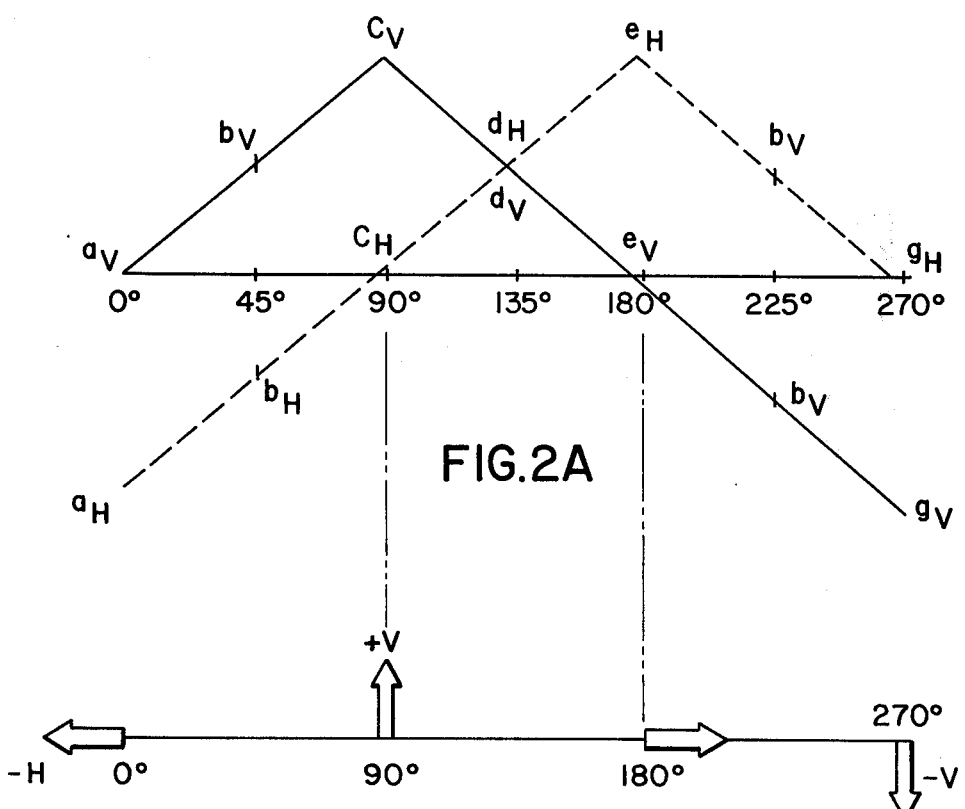
FIG.2A
FIG.2B

| X | Y | |
|---|---|---|
| 1 | 1 | ÷3 |
| 1 | 0 | ÷4 |
| 0 | 1 | ÷6 |
| 0 | 0 | ÷1 |
FIG.10
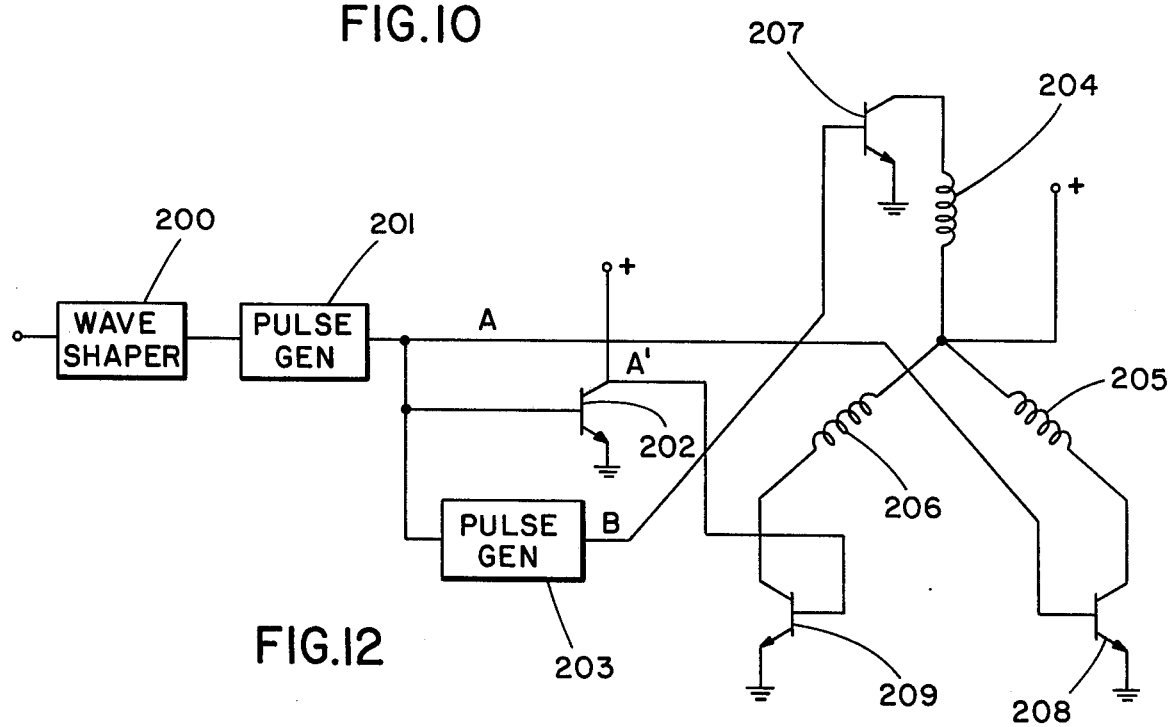
FIG.12
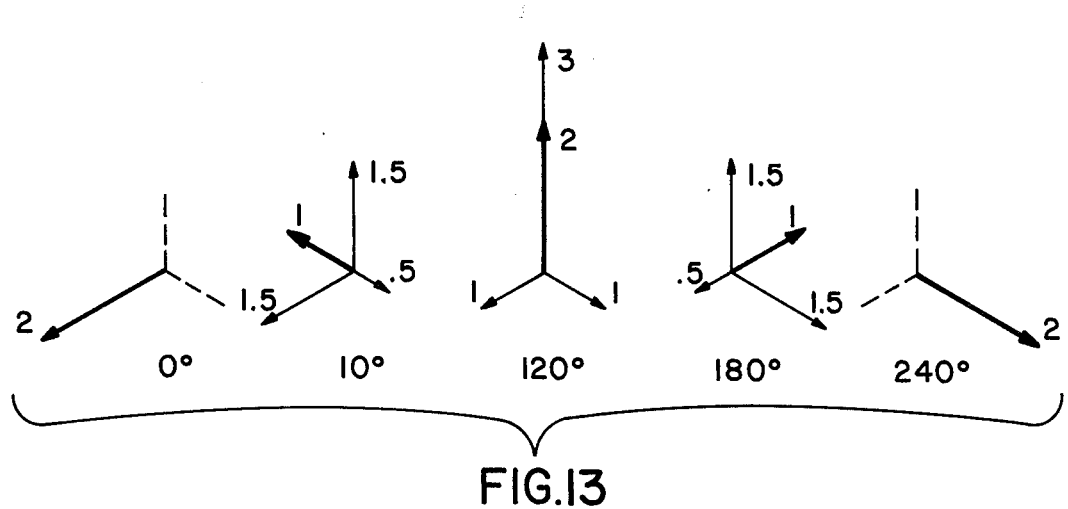
FIG.13

AIR CORE GAUGE WITH EXPANDED POINTER RANGE

BACKGROUND OF THE INVENTION

This application is a continuation-in-part of application Ser. No. 368,502 filed in June 11, 1973 by the same inventors, now abandoned, and assigned to the same assignee as is this application.

This invention relates generally to an air core gauge, and more specifically to an air core gauge having a novel means for expanding the range of pointer movement.

In general, air core gauges use a plurality of coils mounted at various angles with respect to each other and are energized in accordance with some condition at a remote point to provide a resultant magnetic field for rotating a magnet. A pointer shaft is mounted on the magnet and carries a pointer to an angular position so as to indicate changes in the condition at the remote point. Such devices are frequently used as speedometers or tachometers.

Very commonly such devices include two coils positioned at right angles to each other and energized in such a way that the magnetic field produced by one coil increases while the other decreases in response to a changing signal from the remote position until one coil is providing a maximum field in one direction and the other a minimum in the other direction. Under these circumstances the resultant magnetic field has been shifted 90 degrees permitting a maximum theoretical pointer movement of that amount.

To expand the scale of a pointer movement with two coils, the prior art has resorted to either mechanical gearing or to means for converting repetitive pulses, the frequency of which represents the remote condition (engine speed, for example) to a DC signal proportional to the frequency of the repetitive signals which is then used to switch the direction of the current through the coils to reverse the magnetic field direction.

Exemplary of devices generating and using such a DC signal are the patents to Gelenius U.S. Pat. Nos. 3,168,689 and 3,636,447. One problem with such systems is that the amplification of DC signals is difficult to achieve in that it is well known that DC amplifiers are subject to distortions resulting in inaccurate indications.

Therefore, it is an object of this invention to provide a novel air core gauge which is relatively accurate over a relatively wide range.

It is a further object of this invention to provide a novel air core gauge which does not depend upon inherently unstable amplifiers or signal converting means.

SUMMARY OF THE INVENTION

The foregoing and other objects are achieved in this invention by the provision of angularly disposed coils and switching means for those coils controlled by repetitive signals, the frequency and duration of which are proportional to the value of a remote condition so as to permit the coils to generate a resultant magnetic vector to cause the rotation of a pointer carrying magnet in proportion to the value of the condition.

BRIEF DESCRIPTION OF THE DRAWINGS

The invention itself is set forth in the claims appended hereto and forming a part of this specification, while an understanding of the construction and operation of the various embodiments thereof may be had by reference to the detailed description, together with the drawings in which:

FIG. 1 is a front elevational view of an air core gauge incorporating the principles of the invention;

FIGS. 2a, 2b and 2c are graphs illustrating the relationships between the currents in angularly disposed coils in an embodiment of the invention and the magnetic fields in such coils produced by such currents;

FIG. 10 is a "Truth Table" useful in understanding the embodiment of FIGS. 8A, 8B, 9A and 9B;

FIG. 12 is a circuit diagram of another embodiment of the invention; and

FIG. 13 is a graph providing an understanding of the operation of the embodiment of FIG. 12.

DETAILED DESCRIPTION

Figure 2C:
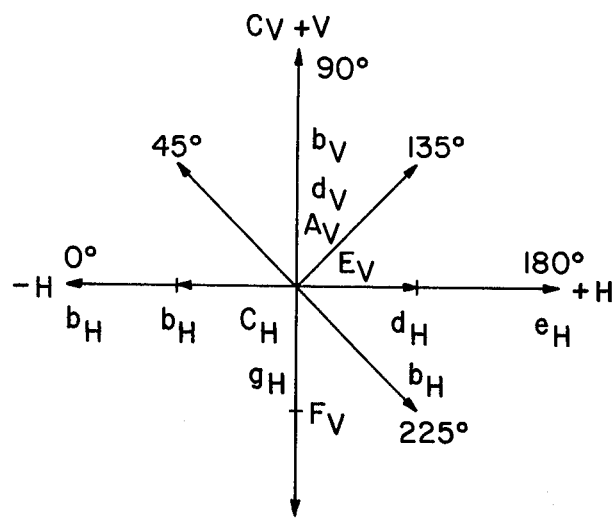

In FIG. 1 there is shown a portion of an air core gauge 10 commonly called a bi-torque gauge which, as stated, may find use as a tachometer or speedometer.

In the embodiment illustrated coils H and V are wound on a bobbin 12 as, for example, in the manner shown in U.S. Pat. No. 3,694,750 issued Sept. 26, 1972. The coils produce magnetic fields along mutually perpendicular axes intersecting at their center, and the fields so produced rotate a disc type permanent magnet 14, partially shown through a broken away portion of the coils. The magnet 14 is secured to a rotatably supported shaft carrying an indicator needle 16 at one end thereof. The indicator needle is placed on the shaft at a desired zero position relative to a dial or scale 18 indicating engine speed or other condition by its rotation relative to that dial or scale.

The scale illustrated shows speed markings in RPM with 90° representing 3,000 RPM, 180° representing 6,000 RPM and 270° representing 9,000 RPM. It will be appreciated that the scale and markings illustrated are by way of example only, and that a dial 18 could be provided with any desired indicia representing the value of the condition being monitored.

Windings H and V produce magnetic fields in a given direction and strength along their axis, depending on the direction and magnitude of the current therethrough. The individual magnetic fields combine to produce a resultant field for aligning the magnet 14 accordingly, and thereby positioning the pointer. The direction and magnitude of the currents in the coils are controlled so that when the field associated with coil V, for example, reaches a maximum in one direction and the other coil H produces no field, the resultant magnetic vector is at 90° or parallel to the axis of V. If H provides the only field the pointer is parallel to its axis. The position of the pointer, therefore, at any one time is dependent on the angular position of the magnet relative to the coils H and V and, therefore, upon the magnitude and direction of the currents flowing in those coils.

By reference to FIGS. 2a, 2b and 2c the relationship of the currents in the coils H and V to produce a rotation of the magnet over a wide range thereby providing an extended range gauge may be seen.

FIG. 2a illustrates the relationship between the average coil currents or magnetic fields in the two coils H and V when it is desired to provide a gauge capable of providing an indication from 0° to 270° of pointer rotation. The solid line curve represents the average current or mmf in the coil V while the dotted line curve represents the same quantities for the coil H. The specific points $a_V$ through $g_V$ and $a_H$ through $g_H$ are intended to show relative values at specific degrees of rotation, namely, 45°, 90°, 135°, 180°, 225° and 270°. Thus, at 0° of rotation in the embodiment illustrated it is contemplated that the coil V would have 0 current and, therefore, be producing no mmf while the coil H would have a maximum negative value of current. It should be understood in this explanation, and that which follows, the terms "negative" and "positive" are arbitrarily chosen with the term negative, meaning a current flow effective to produce a magnetic vector extending to the left as shown in the drawing in the case of the coil H and downward in the case of the coil V, and the term positive being used to designate a current required to produce a magnetic vector extending to the right in the case of coil H and upwardly in the case of coil V.

FIG. 2a illustrates the magnetic vectors produced at 0°, 90°, 100° and 270° when the coils H and V are excited in accordance with the curves illustrated in FIG. 2a.

FIG. 2c illustrates how the magnetic vectors produced in the coils H and V are combined to produce resultant magnetic vectors effective to rotate the pointer from 0° through 270°. Thus, at 0°, that is, at points $a_V$ and $a_H$, $a_V$ 0 while $a_H$ is maximum negative. At 45° the positive current in coil V has increased to the point designated $b_V$ while the negative current in coil H has moved toward 0 to the point $b_H$. As FIG. 2c illustrates the resultant magnetic vector under those circumstances extends at 45° and the pointer is so positioned. At 90° the current in coil H is 0, point $c_H$, while the current in coil V is maximum positive, point $c_V$, and the resultant magnetic vector, therefore, is at 90°. The manner in which the vectors in the coils H and V combine to produce the remainder of the rotation to the 270° point can be derived by an inspection of FIG. 2a in conjunction with FIG. 2c.

Figure 3:
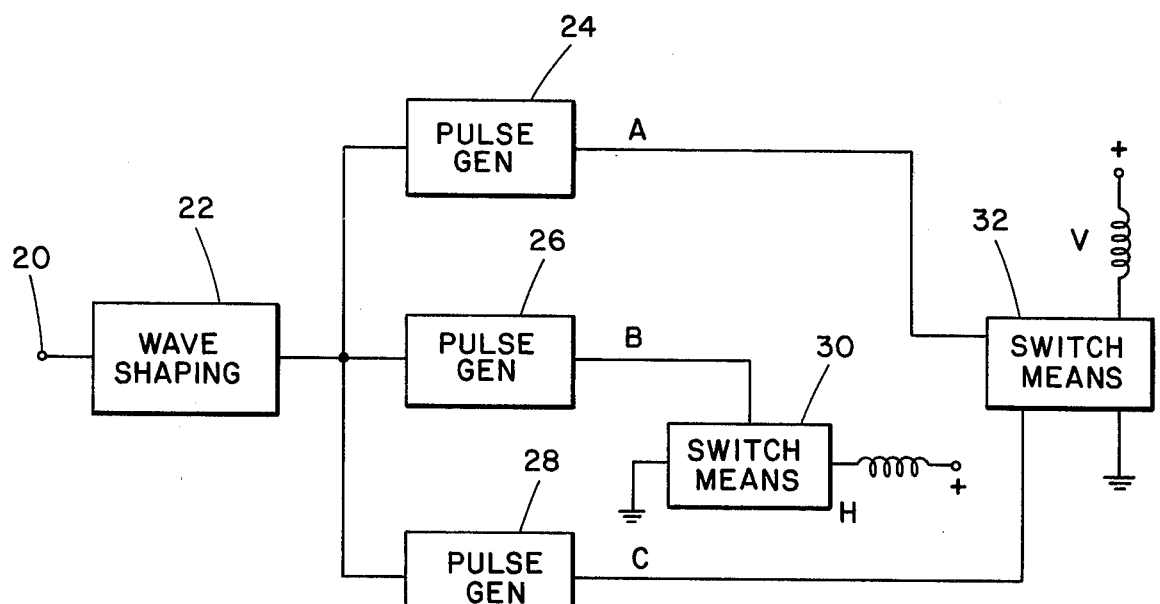
FIG. 3 is a block diagram illustrating generally the circuitry of a device in accordance with the invention.

Referring now to FIG. 3, the general arrangement of the circuit of an embodiment of the invention may be seen. In this embodiment a terminal 20 is adapted to be connected to a source of repetitive pulses, the varying frequency of which are representative of changes in a remote condition. The condition could be the RPM of an engine, in which case the signals could be derived from a contact opening and closing at a rate determined by the engine speed. Alternatively, a magnetic pickup could be used and mounted appropriately to produce pulses indicating vehicle speed. Obviously the condition to be monitored and the source of representative repetitive pulses may be varied by a designer in accordance with his particular needs.

The pulses supplied to the terminal 20 may be coupled to a wave shaping circuit 22 which may take the form of any well known circuit for receiving pulses and producing an output pulse as, for instance, a fixed amplitude square wave or spike, whatever is desired. The output of the wave shaper 22 is supplied to a plurality of pulse generators 24, 26 and 28, each of which may be constituted by a monostable multivibrator producing output pulses of varying duration designed respectively as the A, B and C pulses.

The A, B and C pulses are used to control the operation of a switch means 30 associated with the horizontal coil H and a switch means 32 associated with the vertical coil V. As may be seen, each of the switch means 30 and 32 are connected to their associated coils so as to control the flow of current through the coils from a source, preferably DC.

As will be seen hereinafter, it is contemplated that more than two coils may be used in various embodiments of the invention, and as will also be seen hereinafter the manner in which the A, B and C signals operate the switch means associated with each coil may be varied in order to provide current flow in each coil to produce desired resultant mmf vectors.

Figure 4:
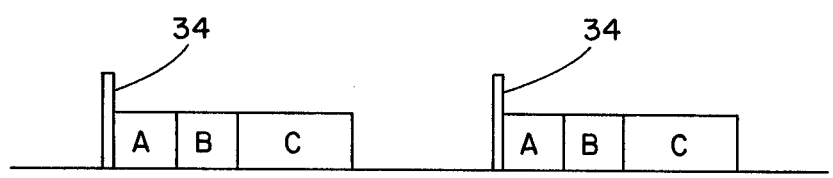
FIG. 4 is a graphical illustration of the relationship between the input and output pulses of the control circuitry forming a part of the invention.

FIG. 4 illustrates the time relationship of the A, B and C pulses in a preferred embodiment. In that figure the pulse input to the wave shaping means 22 is represented by the higher amplitude pulse 34 which when received causes the pulse generators to produce the A, B and C pulses indicated. As will be explained in connection with the description of a specific circuit the arrangement is such that as the frequency of the input pulses increases the time interval between the pulses 34 decreases. Therefore, at higher frequencies, that is, for instance, higher speeds or engine RPM, the space between the pulses 34 will diminish and can diminish to the point where no C and just a portion of a B pulse may be produced. As the result of this the times during which the switching means 30 and 32 are operated to permit current flow in the coils is varied, and those variations in response to the appearance and the duration of the A, B and C pulses may be selected to produce current flows and resultant mmfs effective to cause the magnet and its associated pointer to rotate as a function of the frequency of the pulses 34.

Figure 5A:
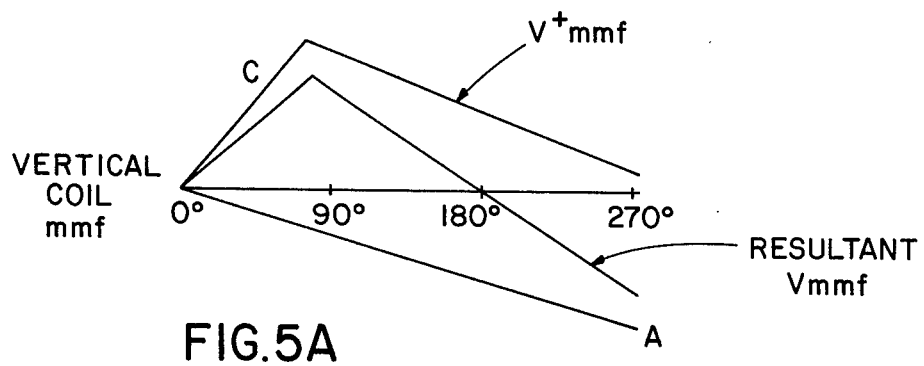
FIGS. 5a and 5b are graphs illustrating how the magnetic fields produced by angularly disposed coils in accordance with one embodiment of the invention, in response to signals provided by circuitry illustrated generally in FIG. 3, may be combined to produce the desired resultant magnetic fields.
Figure 5B:
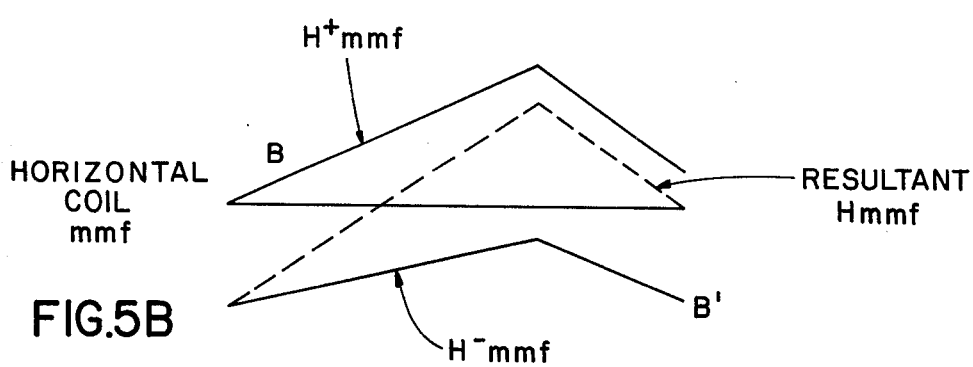

One manner in which this can be done can be seen by reference to FIGS. 5A and 5B. In FIG. 5A the current or mmf of the vertical coil V is designated "resultant V mmf", and, as may be seen, corresponds to the solid line curve of FIG. 2A. In FIG. 5B the current or mmf of the horizontal coil is designated "resultant H mmf" and corresponds to the dotted line curve of FIG. 2A.

The resultant V mmf can be produced by causing currents to flow in coil V, producing the mmfs designated $V^+$ and $V^-$, by utilizing the A and C pulses to control the switching of the coil V. In order to produce the resultant H mmf and the $H^+$ and $H^-$ mmf curves can be combined by utilizing the B and a so-called B' pulse, which is the absence of a B pulse, which add to produce the resultant H mmf.

Figure 6:
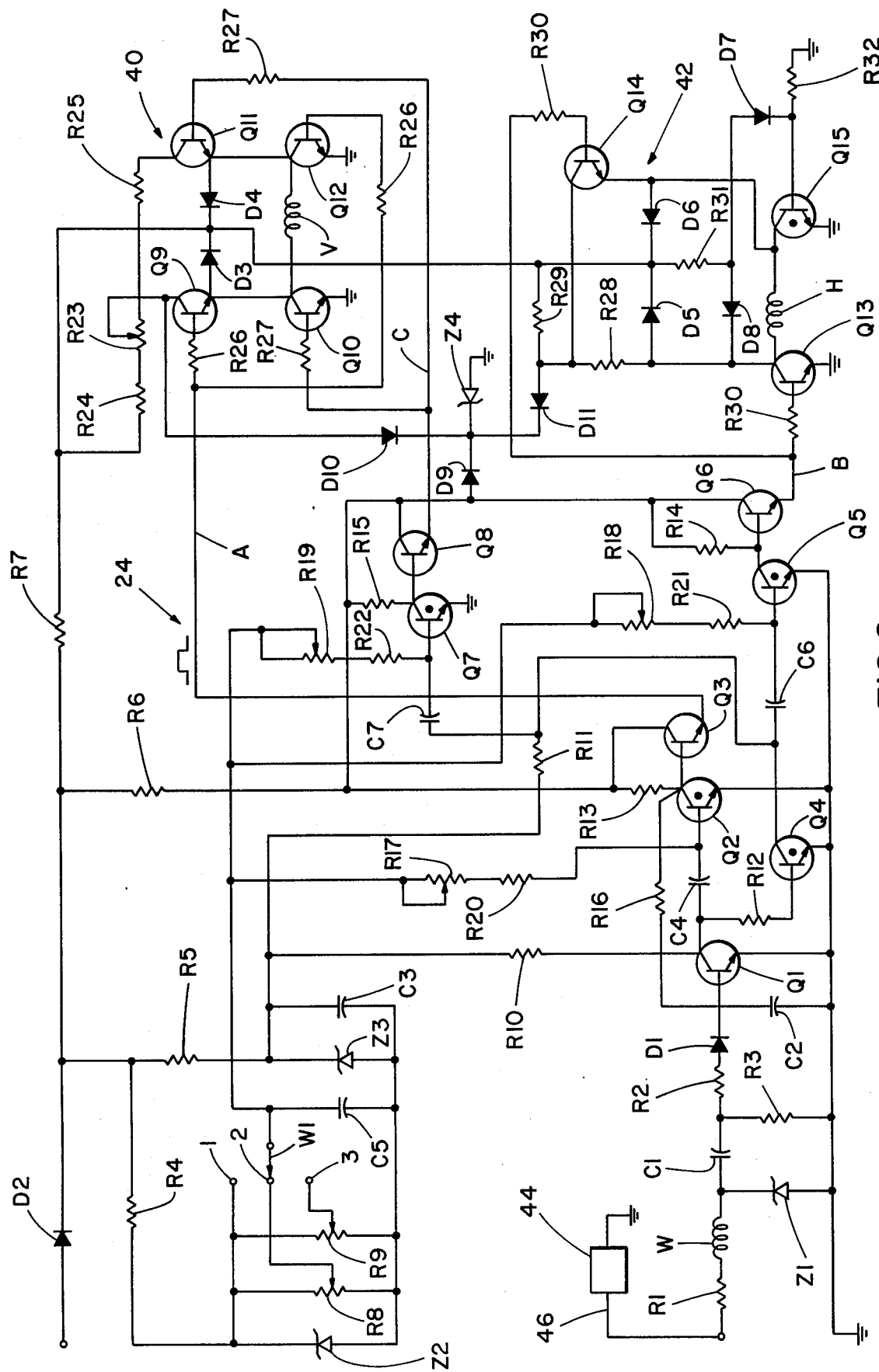
FIG. 6 is a schematic diagram of a first embodiment of the invention.

To provide a further understanding of the invention reference is made to FIG. 6 which illustrates a first embodiment thereof. In the circuit shown the coils V and H are respectively connected in bridge circuits 40 and 42, which are specific embodiments of the switch means 32 and 30, respectively, shown generally in FIG. 3.

The bridge circuit 40 includes transistors Q9, Q10, Q11, and Q12. The collector of Q9 is connected to a source through an adjustable resistor R23, resistor R24, resistor R7 and diode D2. The collector of Q11 is connected to the source through the same elements and a resistor R25. The coil V itself is connected between the collectors of Q10 and Q12. The bridge is completed by connecting the emitters of Q9 and Q11 to the collectors of Q10 and Q12. The arrangement is such that current flows in coil V in one direction if Q11 conducts in series with Q10 and flows in the opposite direction if Q9 conducts in series with Q12.

In order to control the conduction of the transistors Q9 through Q12 their base circuits are positive to the outputs of the pulse generators. Thus, it may be seen that the base circuits of the transistors Q9 and Q12 are connected through the resistors R26 to the emitter of a transistor Q3, which emitter constitutes the output of the pulse generator 24 shown in FIG. 3. At the same time the base circuits of the transistors Q10 and Q11 are connected through the resistor R27 to the emitter of transistor Q8 being the output of the pulse generator 28. Therefore, when transistor Q3 conducts transistors Q9 and Q12 are turned on and there is a current flow through coil V in a first direction. When transistor Q8 conducts transistors Q10 and Q11 will conduct and current flows in coil V in the opposite direction, thus current will flow in the coil V, depending upon the presence or absence of outputs from the pulse generators 24 and 28, that is, depending upon the presence of pulses A and C. The diodes D3 and D4 serve to shunt any positive spikes which may appear at the coil V.

In FIG. 6 the switch means 30 for the coil H is constituted by the bridge circuit 42 which includes transistors Q13, Q14 and Q15. The collector circuit of Q13 is connected to one end of the coil H and to the source through resistor R7 and resistors R28 and R29. The collector Q15 is connected to the other end of the coil H and also to the source through the same resistors as connect the collector of Q13. Shunting of positive spikes is provided by the diodes D5 and D6. The base circuits of the transistors Q13 and Q14 are connected through the resistors R20 to the emitter of transistor Q6 being the output of the pulse generator 26 producing the B pulse, and those transistors conduct the response to the conductive state of Q6. A diode D7 and resistor R31 connect the base of transistor Q15 to the source so that Q15 is normally biased on to provide current through coil H in the negative direction when Q13 and Q14 are not conducting. Therefore, at the beginning of any cycle of operations there is a current flowing in coil H to establish an initial negative magnetic field represented by the point $a_h$ in FIG. 2a and to thus position the indicator needle at a zero position. The diode D8 connects the base of Q15 to the collector of Q13 so that when Q13 conducts the negative swing of its collector will cause Q15 to turn off. In order to provide protection from voltage surges from the source for the circuit the diodes D9, D10 and D11 clamp the collectors of the transistors to which they are connected to ground through the Zener diode Z4.

Thus it may be appreciated at this point current will be caused to flow in the coils V and H, depending on the conduction of their switching means or controlling transistors, and these in turn are controlled by the output transistors Q3, Q6 and Q8 of the pulse generators 24, 26 and 28.

The input to the circuit may be constituted by the pulse source 44 which may be the breaker points of an engine, and, therefore, supply pulses at a rate depending upon engine speed via a conductor 46. Wave shaping is accomplished by the provision of a circuit consisting of the resistor R1, coil W, capacitor C1, Zener diode Z1, resistors R2 and R3 and diode D1. The coil W serves to shape the incoming pulses into substantially a square wave while the capacitor C1 and resistor R2 together serve to differentiate the square wave to produce a positive going spike at the base of a transistor Q1.

In order that means may be provided, where a circuit, in accordance with the invention is to be used as a tachometer for engines with different numbers of cylinders voltage from the source is supplied through a resistor R4 connected to ground through a Zener diode Z2. The source voltage is connected directly to the terminal 1 of a switch SW1 and to the terminals 2 and 3 of that switch through respective adjustable resistors R8 and R9. As will be explained in greater detail hereinafter, it is by this means that the duration of the controlling pulses produced by the pulse generators may be varied depending on the number of cylinders in an internal combustion engine whose speed is being sensed.

A resistor R5 supplies the source voltage clamped to a value determined by the Zener diode Z3 via the resistors R10 and R11 to the collectors of the transistors Q1 and Q4, respectively. Collector voltage for the transistors Q2, Q5 and Q7 is supplied through the resistor R6 and their respective associated resistors R13, R14 and R15. Each transistor Q2, Q5 and Q7 constitutes one element of the A, B and C pulse generators and control the conduction of their associated output transistors Q3, Q6 and Q8 by virtue of the connections between the bases and collectors of these pairs of transistors. In order to maintain the input transistors Q2, Q5 and Q7 of the pulse generators normally conductive in their quiescent initial state their bases are connected through adjustable resistors R17, R18 and R19 via wiper W1 of the switch SW1 to the source. In this condition the transistors Q9, Q10, Q11 and Q12 in bridge 40 are off as are Q13 and Q14 in bridge 42. In this fashion a bias of varying voltage, depending upon the position of the wiper W1, is supplied to the base of those transistors. At the same time resistor R17 biases transistor Q1 so as to be normally nonconductive. A bias to maintain Q4 conductive is supplied via the resistors R10 and R12. In order that the transistor Q4 may control the conduction of the transistors Q5 and Q7 the bases of those latter transistors are coupled to the collector of Q4 through the capacitors C6 and C7. The capacitor C4 couples the collector of Q1 to the base of Q2 for the same purpose. Because the transistor Q4 is normally conductive the capacitors C4, C6 and C7 are charged to an initial voltage through their associated resistors R17, R18 and R19 and the magnitude of that charge is determined by the setting of those resistors and the position of the wiper 1.

Figure 7:
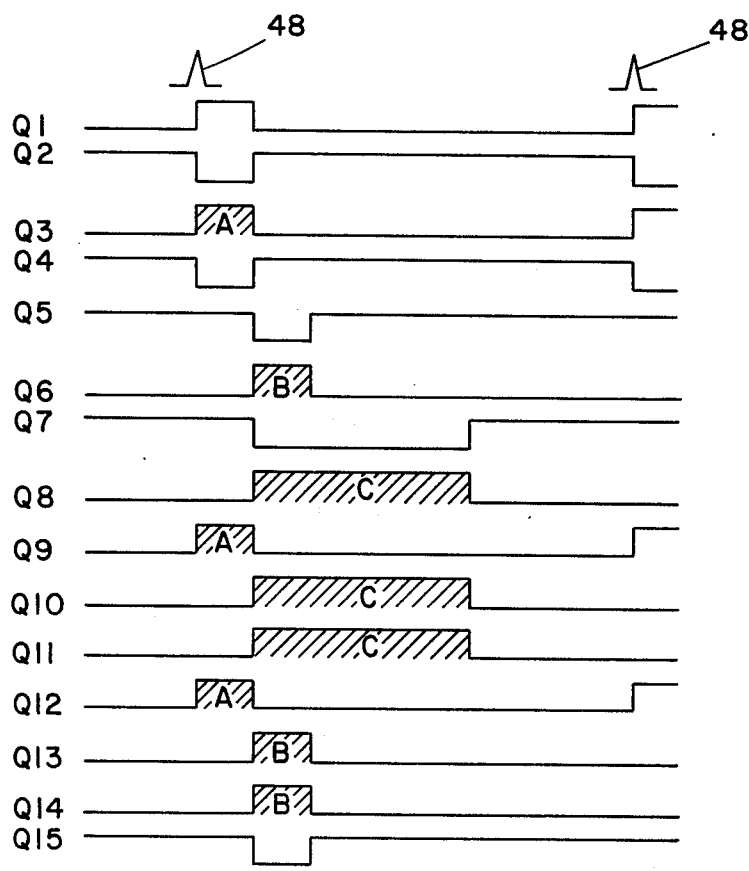
FIG. 7 is a timing diagram illustrating the conduction of the various transistors in the circuit of FIG. 6.

In order to understand the operation of the circuit of FIG. 6 reference is made to that circuit and the timing diagram of FIG. 7, wherein the conductive state of each transistor is shown. With the wiper arm W1 positioned on one of the terminals 1, 2 or 3, depending upon the number of engine cylinders, an appropriate charge voltage level for the capacitors C4, C6 and C7 is selected. Initially, as stated, the transistors Q2, Q4, Q5, Q7 and Q15 are conducting. With Q15 conducting current is flowing in the negative direction in the coil H via a circuit from the source, including the resistors R27, R28 and R29. Under these conditions the resultant magnetic field is that indicated at point $a_h$ in FIG. 2c, that is to say, it is maximum negative, and in the case of a tachometer this is taken to be zero RPM.

As the engine operates a positive pulse in the form of a spike 48 is supplied via the diode D1 to turn on the transistor Q1. As transistor Q1 conducts it turns off transistor Q2 and discharges capacitor C4. When Q2 turns off it turns on Q3. The conduction of Q3 is the beginning of the A pulse, and this is shown in FIG. 7 by the crosshatching and letter A beneath the Q3 curve. The conduction of Q3 in turn causes Q9 and Q12 to conduct. With Q9 and Q12 turned on a current flows in coil V in a negative direction for a time determined by the duration of the A pulse. This, of course, indicates that the engine has begun to rotate and the RPM is, therefore, something other than zero.

The duration of the A pulse is determined by the time required to discharge capacitor C4 to the point where Q2 once again conducts. When this occurs Q3 is turned off and the duration of the A pulse has been determined. The effect of this has been to supply a pulse in one direction in the coil V. When Q1 conducted Q4 was turned off and the capacitors C6 and C7 began to charge through R11 to a value determined by the position of the wiper W1. These capacitors initially charged positive when Q4 is turned off so as to maintain Q5 and Q7 conductive, but when Q4 turns back on, when Q1 once again conducts, the negative swing of Q4's collector voltage causes Q5 and Q7 to turn off in synchronism. When Q4 turns on the capacitors C6 and C7 dischaged through R18 and R19, respectively, whereby the time duration of the B and C pulses is determined. Q5 and Q7 upon turning off each cause their associated output transistors Q6 and Q8, respectively, to turn on the turning on of Q6 and Q8 to begin the B and C pulses indicated in FIG. 7 by the crosshatching and letter designations beneath the curves representing the outputs of those devices.

When Q6 turns on the transistors Q13 and Q14 in the bridge 42 are turned on and the transistor Q15 in that bridge is turned off because the negative swing through the diode D8 clamps the base of Q15 to ground. Under these circumstances current flows in the coil H in the positive direction for a period of time determined by the duration of the B pulse. At the same time the conduction of Q8 causes a current to flow in the positive direction in the coil V for a period of time determined by the C pulse because the transistors Q10 and Q11 in the bridge 40 are now turned on.

It is to be noted with reference to FIG. 7 that the current flow in coil H during the period transistors Q13 and Q14 are conducting is greater than the current flow in the opposite direction than when Q15 is conducting because the conduction circuit in the latter case includes the resistor R28 which is not present in the former situation. The resultant magnetic field in coil H, therefore, starts to move in a positive direction toward the point $b_h$ shown in FIGS. 2a and 2c.

With conducting as it is Q4 after the period of pulse A the capacitors C6 and C7 may once again be charged back to their original value to turn transistors Q5 and Q7 back on. Q5 turning on terminates conduction by Q6 and the transistors Q13 and Q14 in turn are turned off. The time interval required for Q5 to turn on after Q4 conducts is, as stated, determined by the RC time constant for the circuit including R18 and R21, and this fixes the duration of the B pulse.

The duration of the C pulse is determined by the RC time constant of the charging circuit for the capacitor C7 including R19 and R22 and it is selected to be greater than the time constant of the circuit, including C6, so that some time after Q5 conducts in response to the conduction of Q4, Q7 will conduct turning off Q8 and consequently Q10 and Q11. Thus, as may be seen, the B pulse is of approximately the same duration as the A pulse but follows it in time while the C pulse is approximately three times as long as the A pulse and it too follows the A pulse in time.

The total result, therefore, is to control the average current flow in the coils H and V over a period of time producing magnetic fields associated with each of those coils which combine to produce a resultant magnetic field.

Upon the recurrence of an input pulse 48 the cycle will repeat itself. It will be noted by reference to FIG. 7 that if the input pulse rate were to increase the pulses 48 would move closer together. The first effect that can be seen is that the ratio of the time in which the transistor Q15 conducts with respect to the time in which the transistors Q13 and Q14 conduct will be reduced so that the average net negative current in the coil H will be reduced and the mmf of that coil will move in a positive direction toward zero. At the same time the coil V is pulsed more frequently by both pulses A and C, and since the C pulses are three times as long as the A pulses the average or resultant field provided by the coil V likewise moves in a positive direction. Thus, when the average negative field in coil H is at the point $b_h$ and the average positive field in the coil V is at the point $b_v$, the resultant magnetic field is at 45° from the zero axis and a needle will accordingly point in that direction. This would correspond to a speed of 1500 RPM on the tachometer face shown in FIG. 1.

As the engine speed increases, in the case of a tachometer, the current in the coils H and V tend to move in a more positive direction. Therefore, at the points $c_v$ and $c_h$ the positive and negative currents in the coil H balance each other and the current caused by the C pulses are at a maximum or $c_v$. In FIG. 2a the condition is that shown in FIG. 2c where there is zero net field in coil H and a maximum positive field in coil V so that the pointer is at 90 degrees of scale or indicates an RPM of 3000 in the tachometer shown in FIG. 1.

With further increase of the input pulses 48 they occur still closer together and transistors Q1 and Q2 are turned on and off at greater frequency, but they stay on for the same time period as before as that time if fixed by the RC circuit, including the capacitor C4. Transistor Q4 continues to follow Q1 but turns off with greater frequency to thereby turn Q5 and Q7 off more frequently, and consequently Q6 and Q8 on more frequently. However, Q6 and Q8 are maintained conductive for the same time period as previously.

Eventually the frequency of the signals 48 will be such that the transistor Q1 will receive a pulse 48 and turn off Q4 before Q7 has been rendered normally conductive so that Q7 will be rendered conductive earlier than when under the control of C7 and the effect will be to shorten the C pulse resulting in less average positive current through the coil V. Under these circumstances the field of the coil V starts to move in a negative direction toward the point $d_v$ in FIG. 2a. At the same time the more frequent turning off of Q5 and consequent conduction of Q6 results in a net average positive current or field in the coil H. Consequently the H and V curves move toward the points $d_h$ and $d_v$ in FIG. 2a and produce a resultant field at 135°.

Further increase of the input pulse rate results in more frequent supply of the B pulses and in a further decrease in the duration of the C pulses. At 180° the field in the coil V is zero because the A and C pulses are now of equal duration while the field in the coil H is maximum positive. At 225° the field in the coil V is negative because the A pulses are appearing at a greater frequency and are of the same duration while the C pulses have continued to decrease in duration. At 270° the B pulses are appearing at a frequency to cancel out the negative bias provided by the normal conduction of Q15 while the relative size of the A and C pulses have produced a maximum negative field in the coil V.

Depending upon the position of wiper W1 the maximum voltage for each of the charging circuits including R17, R18 and R19 will be varied depending upon the number of cylinders in an engine. Thus in switch position 1, that is, when there are eight cylinders a maximum charge voltage will be available while lesser amounts will be provided for in positions 2 and 3, the six and four cylinder positions. The effect is to charge the periods fixed by the RC time constants of the charging circuits in a proportionally manner. That is, C4 will charge to a lesser peak when W1 is in the 2 and 3 positions so that the off time of Q2 after Q1 conducts will be longer and the off time of Q5 and Q7 will be proportionally longer.

It should be appreciated that if desired it would be possible to provide for a full 360° of rotation by increasing the average current in the coil V in a positive direction while the average current in the coil H continues to move in a negative direction.

In summary, it may be seen that the embodiment of FIG. 6 comprises a system wherein a pulse representative of a condition is used to generate control pulses effective to control switch means associated with angularly disposed coils so as to produce a resultant magnetic field which rotates as a function of an increasing input pulse rate.

Figure 8A:
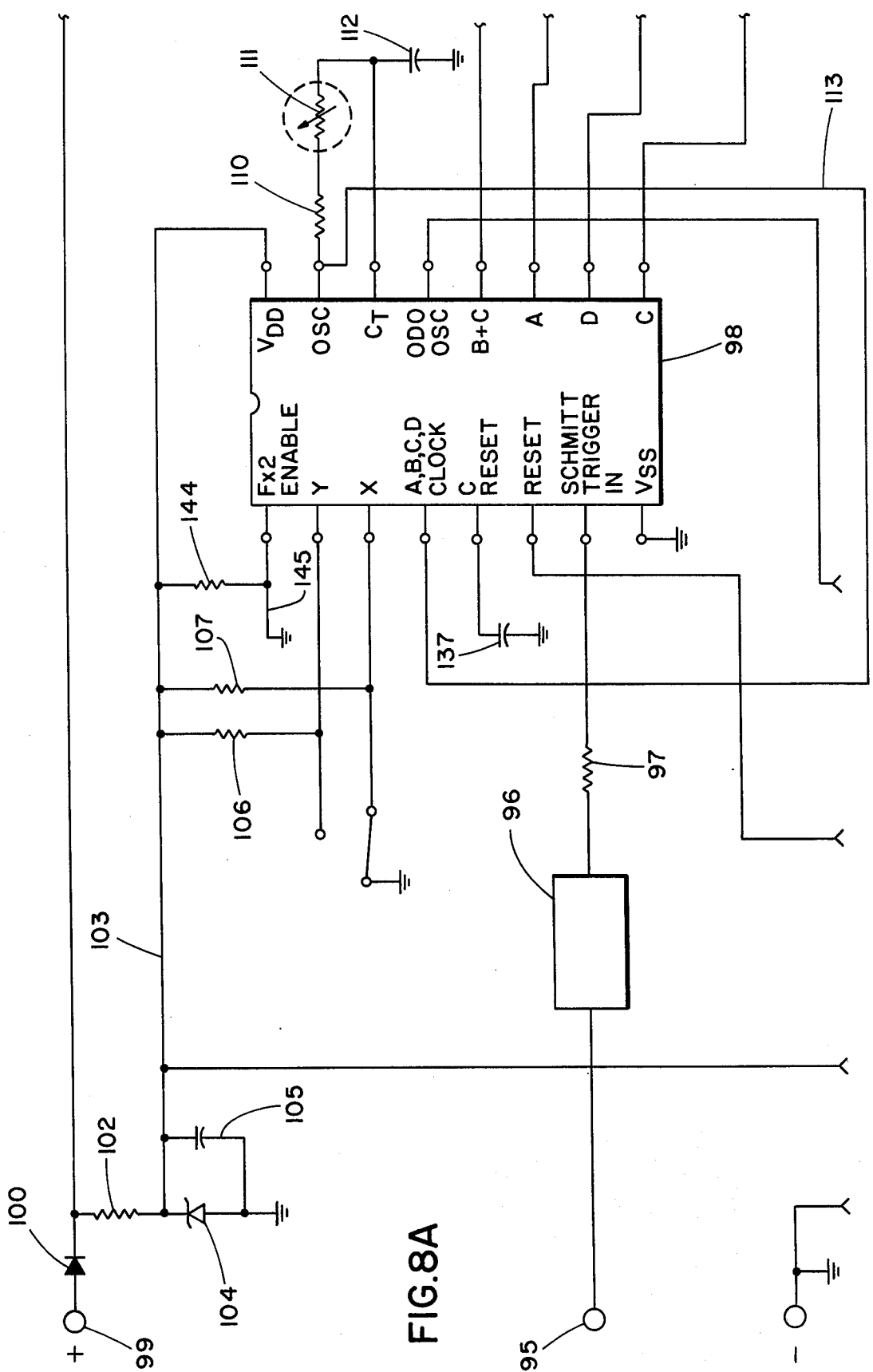
FIGS. 8A and 8B are circuit diagrams of another embodiment of the invention.
Figure 8B:
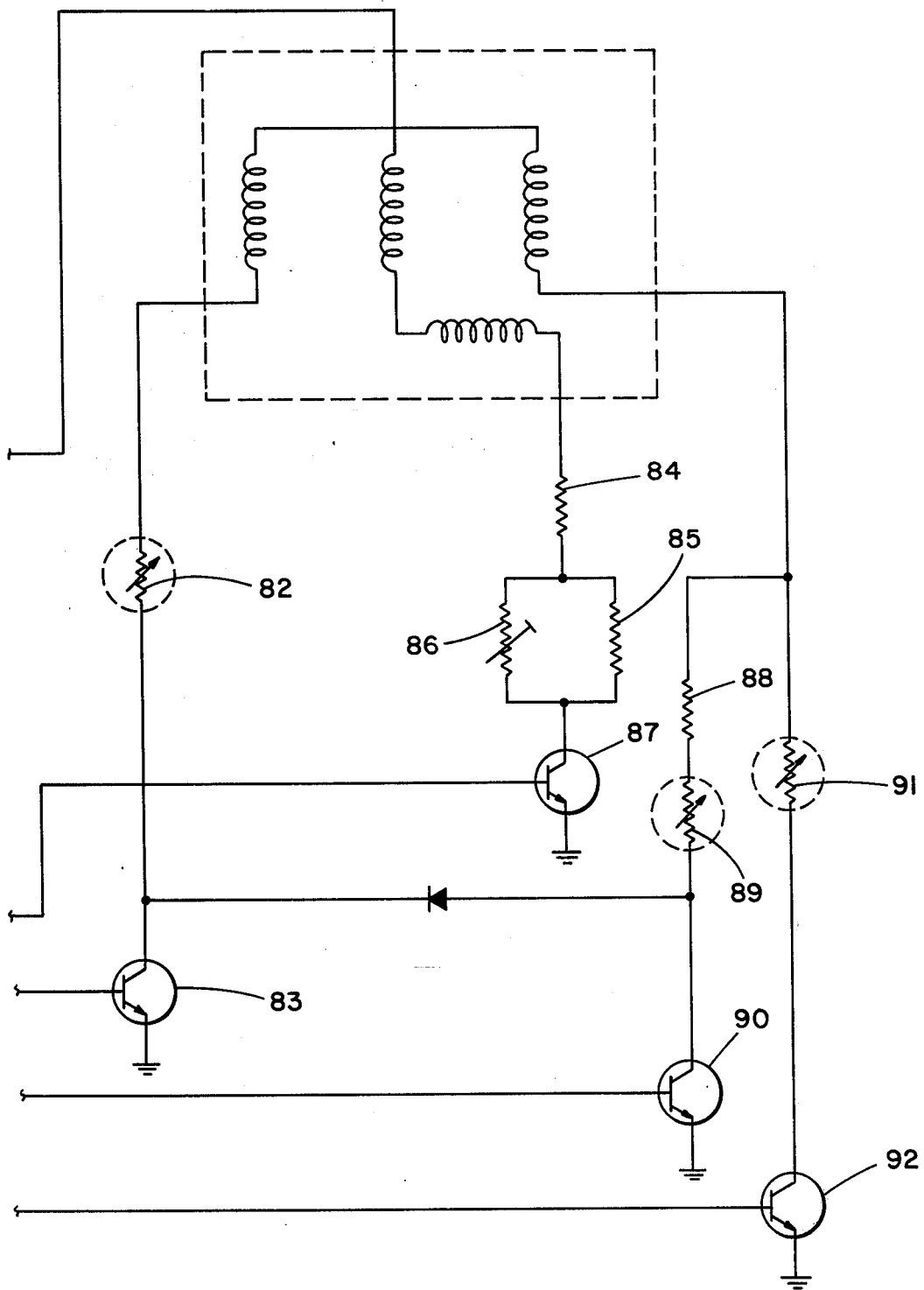

The foregoing is a description of one embodiment of the invention. FIG. 8 illustrates another embodiment of the invention wherein four coils are used, two vertically oriented and two horizontally oriented. In the embodiment just described the essential control may be characterized as one which depends on the RC from constants of circuits controlling the pulse generators. In the embodiment of FIG. 8 a digital apparatus is shown and as will be appreciated, its calibration can be effected by adjusting only one RC circuit instead of three as in the case of the embodiment of FIG. 6.

In FIG. 8 a pair of vertical coils $V^+$ and $V^-$ are provided as are a pair of horizontal coils $H^+$ and $H^-$. A DC source at terminal 99 supplies the coils via a conductor 101. A circuit for the coil $V^+$ is completed through a rheostat 82 and through a transistor 83 to ground. As will be explained hereinafter, the A pulse is supplied to the transistor 83 to control conduction in the $V^-$ coil. The circuit for the $V^+$ and $H^+$ coils is completed through a resistor 84 and a circuit consisting of a resistor 85 and a thermistor 86 in shunt with each other through a transistor 87, controlled by a B+C pulse, to ground. $H^-$ is connected to ground through a pair of shunt paths, the first consisting of the resistor 88, rheostat 89 and transistor 90 receiving a D pulse. The second path includes a rheostat 91 and a transistor 92 receiving the C pulse.

In the circuit of FIG. 8 a signal input terminal 95 receives the repetitive signal representative of a remote condition, and supplies it to a wave shaping circuit 96. The output of the wave shaper, a positive going spike is supplied via a resistor 97 to the input of a pulse generating circuit 98, shown in detail in FIG. 9, to produce A, B, C and D pulses effective to control the average current flow in the coils to produce a rotating resultant magnetic field as described previously.

In this particular embodiment the circuit is designed for use as a tachometer and will be described as such. However, it should be understood that it may also be used as a speedometer and the differences permitting that kind of usage will be described.

In the tachometer shown a unidirectional current source is connected to a terminal 99, the unregulated output of which is supplied via a diode 100 and conductor 101 to the upper ends of the coils $V^-$, $V^+$, $H^-$ and $H^+$. The source voltage at terminal 99 is also supplied via a resistor 102 to a conductor 103 and is held at a desired voltage, $V_{DD}$, by means of a Zener diode 104 shunted by a capacitor 105 to ground.

The voltage appearing on the conductor 103 is supplied through a resistor 106 to one terminal designated 6 of a 4-position selector switch and through a resistor 107 to another terminal, designated 4, of the same switch. The third terminal, 8, of that switch indicated by reference numeral 109 is not connected in the circuit. The wiper arm of the switch 109 is grounded and when connected to either its first or second positions designated as 4 and 6, respectively, a positive voltage is applied to the X and Y terminals of the circuit 98. When connected to 8-position a positive voltage is supplied to both X and Y. In the fourth position of the switch 109 both resistors 106 and 107 are connected to ground through the diodes 106' and 107'. This position is used when it is desired to use the circuit as a speedometer.

The circuit 98 may be characterized generally as a pulse generating circuit, and when it is used as a tachometer the frequency of the control pulses must be related to the number of cylinders in the engine. Depending on whether or not a voltage is applied to the terminals X and Y the pulse rate output of the circuit 98 is changed and the manner in which this is done will be explained in connection with the explanation of FIG. 9.

For convenience and economy the circuit 98 may be fabricated as a so-called custom integrated circuit. This circuit includes an oscillator, the pulse output of which is controlled by an external RC circuit, including a fixed resistor 110 and an adjustable resistor 111 connected between the terminals designated OSC and $C_T$ and a capacitor 112 connected between $C_T$ and ground. The output of the oscillator is supplied via an external conductor 113 to an A, B, C, D clock terminal so designated. Operating voltage for the circuit 98 is supplied via the conductor 103 connected to the $V_{DD}$ terminal while ground is connected to the $V_{SS}$ terminal. The functions of the remaining terminals in the circuit 98 will be explained in connection with the description of FIG. 9.

Figure 9A:
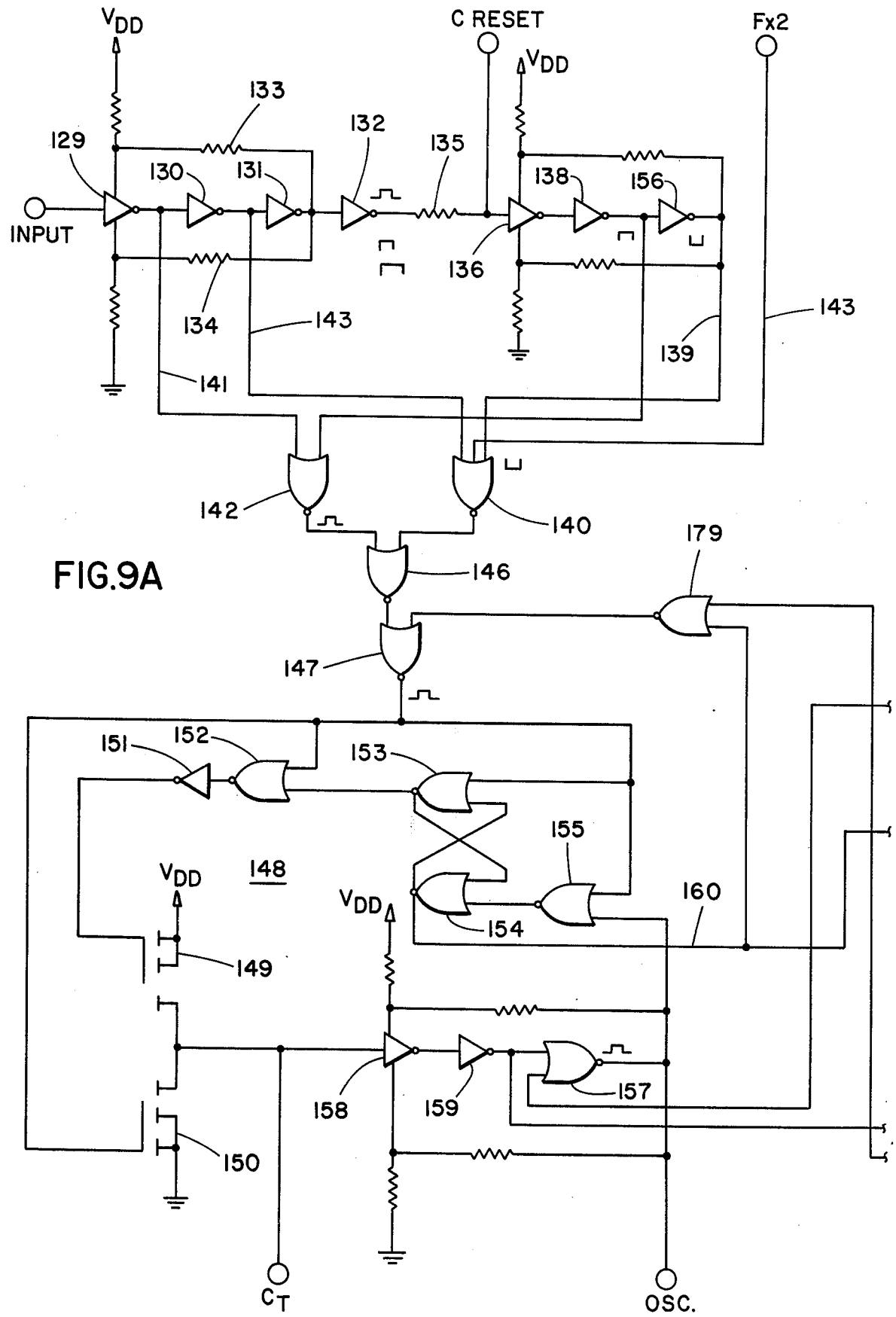
FIG. 9A and 9B are circuit diagrams illustrating in greater detail portions of the circuits of FIGS. 8A and 8B.
Figure 9B:
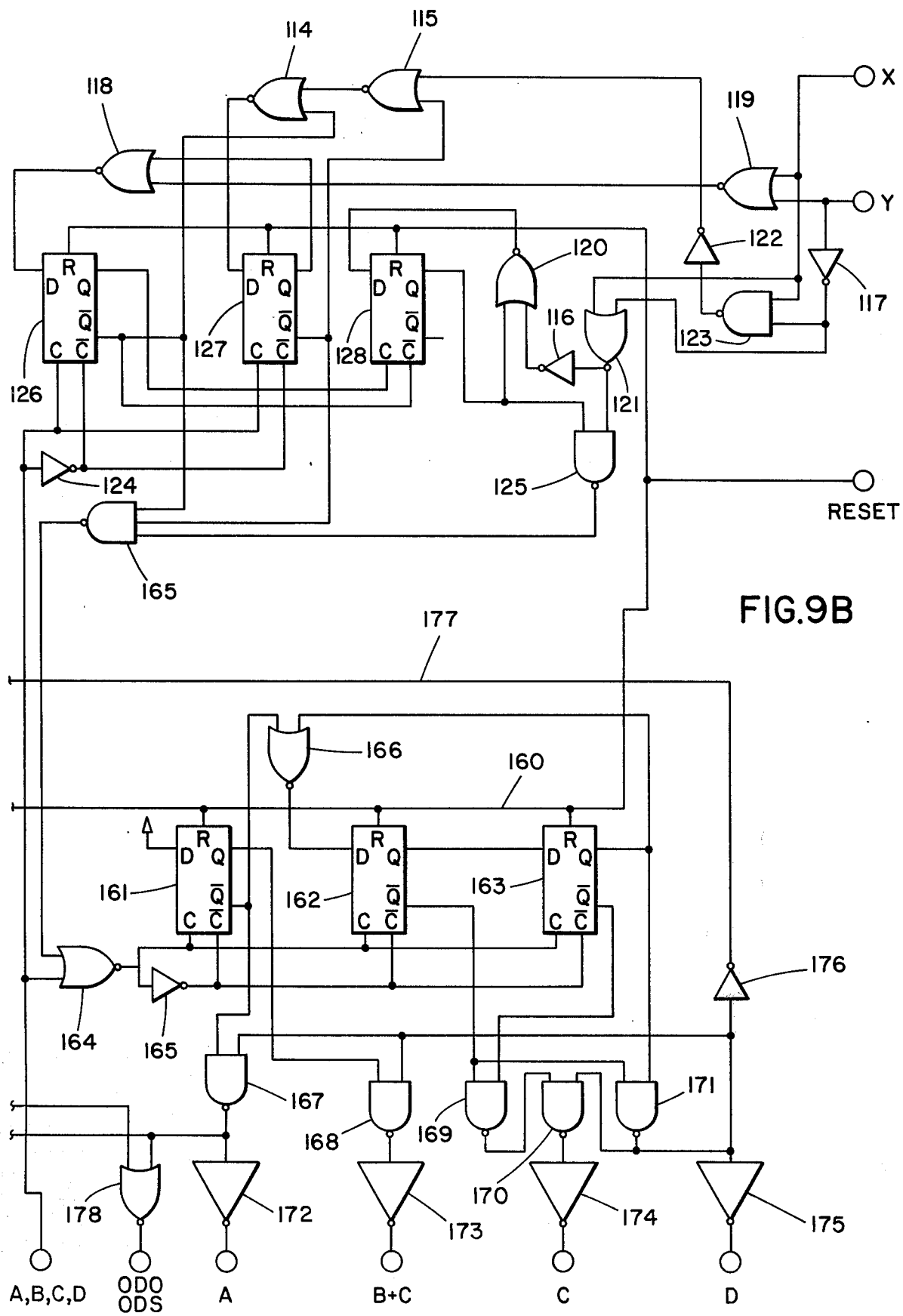

In FIG. 9 the terminals X and Y are connected through a series of decoding gates 114, 115, 116, 117, 118, 119, 120, 121, 122, 123, 124 and 125 effective to control flip flops 126, 127 and 128 whereby the oscillator or clock frequency is divided by a factor of 1, 3, 4 or 6, depending upon whether the terminals X and Y are selectively grounded or returned to the supply voltage $V_{DD}$. By reference to FIG. 10 a truth table may be seen which shows the division factor, depending upon the condition of the terminals X and Y. Essentially the flip flops 126, 127 and 128 are conditioned to toggle depending upon the state of their respective D terminals which in turn are enabled depending upon the state of the gates 118, 114 and 120.

The repetitive condition responsive pulse supplied an an input to the circuit 98 is received by a Schmidt Trigger consisting of the amplifier inverters 129 through 132 and the feedback circuits including the resistors 133 and 134. The output of inverter 132, therefore, is a square wave which is supplied via a resistor 135 to the junction of a C RESET terminal and an inverter 136. The C RESET terminal is connected through a capacitor 137 to ground (see FIG. 8). The RC time constant fixed by the resistor 135 and capacitor 137 determined the time duration for a narrow pulse designated as the reset pulse. The inverter 136 and an inverter 138 in conjunction with this RC circuit produce a retangular shaped pulse of predetermined width. This pulse is generated on the positive going portion of the incoming signal and is transmitted via conductor 139 as one input to a NOR gate 140. As may be seen, the output of inverter 129 is supplied via conductor 141 to a NOR gate 142, while the output of inverter 130 is supplied via conductor 143 as an input to gate 140. The other input to gate 140 is from a terminal FX2 via conductor 143. By reference to FIG. 8 it may be seen that the terminal FX2 may be connected via resistor 144 and conductor 103 to the source or may be returned to ground as indicated by the symbolic switch 145.

The output of the gates 140 and 142 constitute the input to a NOR gate 146 and its output in turn is one input to a NOR gate 147.

In order to produce the A, B, C and D control signals an oscillator 148 is provided. The oscillator is constituted by a pair of field effect transistors 149 and 150 having a common terminal connected to a $C_T$ terminal. The gate of transistor 149 is connected through an inverter 151, and NOR gate 152, the output of 147 while the control of transistor 150 is connected directly to gate 147. As shown in FIG. 8, an RC timing circuit consisting of the resistors 110 and 111 and capacitor 112.

When the reset pulse at the inverter 156 via conductor 139 is coupled through the gates 140, 146 and 147 to appear at the output of 147, transistor 150 is driven on and transistor 149 is driven off, thereby discharging capacitor 112 connected through the $C_T$ terminal to ground. This in turn drives the output of a gate 157 through inverters 158 and 159 to a high state. With the output of gate 147 high and the output of gate 157 high the output of gate 154 is high. This signal is coupled via the conductor 160 to the R or reset pins of the flip flops 161, 162 and 163 as well as those of the flip flops 126, 127 and 128 high thereby forcing their Q outputs to a low state.

At the end of the reset pulse out of gate 11 the transistor 149 is driven on and the transistor 150 off. The capacitor 112 now charges through transistor 149 and the $C_T$ terminal to ground. After a period of time determined by the RC time constant of that circuit the gate 157 is switched to a low state through the inverters 158 and 159. The purpose of the reset pulse is to always return the timing capacitor and the oscillator 148 to their initial starting conditions.

When gate 157 goes low the six flip flops 126, 127, 128, 161, 162 and 163 are also returned to their initial starting conditions. This initial condition will be established at any time during the sequence of operation of the circuit whenever the reset pulse occurs. As can be seen, the occurrence of the reset pulse is determined by the frequency of the incoming signal.

For a tachometer circuit the output of the oscillator derived at the output of the gate 157 can be supplied directly to the terminal designated ABCD and coupled through the gate 164 to the C terminals of the flip flops 161, 162 and 163 and via the inverter 165 to the $\overline{C}$ terminals of those flip flops so as to toggle those flip flops sequentially. Likewise the pulse output gate 157 toggles the flip flops 126, 127 and 128 of the counting circuit causing their $\overline{Q}$ terminals to go low depending on the voltage at the terminals X and Y.

The outputs of the counting circuit consisting of the flip flops 126, 127 and 128 are summed by the NAND gate 165 to provide a pulse into gate 164. On the negative going edge of the pulse generated from gate 164 flip flops 161, 162 and 163 are toggled sequentially. Gates 166, 167, 168, 169, 170 and 171 decode the respective states of the flip flops 161, 162 and 163 to produce output pulses designated as the A, B+C, C and D pulses. These pulses actually appear at the output of amplifier inverters 172, 173, 174 and 175, and are effective to control the conduction of the transistors 83, 87, 90 and 92 to vary the average current through the gauge coils and produce the resultant magnetic field as described.

When the pins X and Y are both connected to the supply voltage three clock oscillator pulses will be required to toggle the flip flop 161. It will then require three additional pulses to return the output of that flip flop to its original state and toggle flip flop 163. Consequently the pulse width of A at the output of 172 will be determined by the width of three clock oscillator pulses and pulse width B+C at the output of 173 will be comprised of nine clock oscillator pulses following the completion of the A pulse. The same sequences will apply to the other divide-by ratios indicated in the table of FIG. 10.

When 175, designated as pulse D, is energized a signal is supplied via inverter 176 and a conductor 177 to the input of the gate 157. Under these circumstances the oscillator 148 is blocked from transmitting any additional clock pulses out of the OSC terminal into the ABCD terminal. The circuit will remain in this steady state condition until the next reset pulse occurs to regenerate the string of pulses.

The output of gate 167 may also be supplied to a NOR gate 178, the output of which is available at a terminal designated OSC. II and the pulses produced thereby may be for other purposes.

A gate 179 also receives the output of gate 167 via a conductor 180 and its output in turn is supplied to the gate 147. This connection prevents the reset pulse from being generated by the gate 147 during the A pulse width. This feature prevents extraneous electrical noise on the signal input from falsely triggering the circuit at high frequencies.

The overall operation of the circuit is as follows. Initially the switch 109 is set to a position determined by the number of cylinders in the engine. A setting of this switch determines the counting rate of the flip flops 126, 127, 128 in accordance with the truth table shown in FIG. 10. If the circuit is to operate in conjunction with an 8-cylinder engine the switch 109 is moved to position 108 and under these circumstances a positive voltage is supplied to both terminals X and Y so that the flip flops will count once for every three pulse input. If the engine has six cylinders the X terminal will be high while the Y terminal is low, and the circuit will then count once for every four pulse input. For a four-cylinder engine the circuit will count once for every six pulse input. Where the circuit is to be used as a speedometer rather than a tachometer both terminals are low and the circuit counts once for each pulse input.

The repetitive condition responsive pulses are supplied to the input terminal after shaping and at the output 132 of the Schmidt Trigger produce a square wave pulse which is used to provide a reset pulse on 139. The reset pulse is supplied as an input to the oscillator 148 through the gates 140, 146 and 147 and commences an oscillator cycle by turning off transistor 149 and turning on transistor 150. At the same time the output of the gate 157 is used to reset the flip flops so that their Q outputs are at a low state and $\overline{Q}$ outputs are high. At the end of the reset pulse transistor 149 conducts once again and capacitor 139 charges to a value sufficient to cause an oscillator output pulse to appear at the output of gate 157. Then, depending on the voltage states of the terminals X and Y, the flip flops count in the manner described producing in turn the A, B+C, C and D pulses. It should be appreciated that the D pulse is essentially the same as the nonconductive period of Q8, Q10 and Q12 in the circuit of FIG. 6 (see FIG. 7) and establishes the negative bias current in the H⁻ coil.

The A pulse when present causes current to flow in the V⁻ coil by causing transistor 83 to conduct. The B+C pulse causes transistor 87 to conduct and thereby controls the current in the V⁺ and H⁺ coils. The C pulse controls the current in the H⁻ coil by controlling the conduction of the transistor 92. The remainder of the operation is as described previously. As the frequency of the input pulses increases the average current through the coils is controlled so as to produce a resultant rotating magnetic vector when acting on a rotatable magnet causes a pointer to move as a function of the frequency of those input pulses.

As stated, the circuit of FIGS. 8 and 9 may also be used as a speedometer. In such an application, because the repetitive input pulses may be of relatively low frequency, it might be necessary to increase the frequency of the reset pulses. Since the input pulses in such an application may be more nearly symmetrical, approximately a sine wave, this can be done by the use of the terminal FX2. In FIG. 8 it can be seen that FX2 can be connected to the source or to ground. When FX2 is connected to the source the gate 140 is disabled and only the input frequency is gated through 146 and 147. However, when FX2 is grounded or low gate 140 is enabled and a reset pulse produced on the rising edge of the input is gated through and a reset pulse produced on the trailing edge is also gated through so that the frequency of the reset pulses is doubled.

At the same time the switch 109 is moved to its fourth position so that the flip flops 126, 127 and 128 count by 1 as no division is necessary in this case. Likewise a wave shaper may not be necessary in this instance for the repetitive input signal may be itself sinusoidal.

Figure 11:
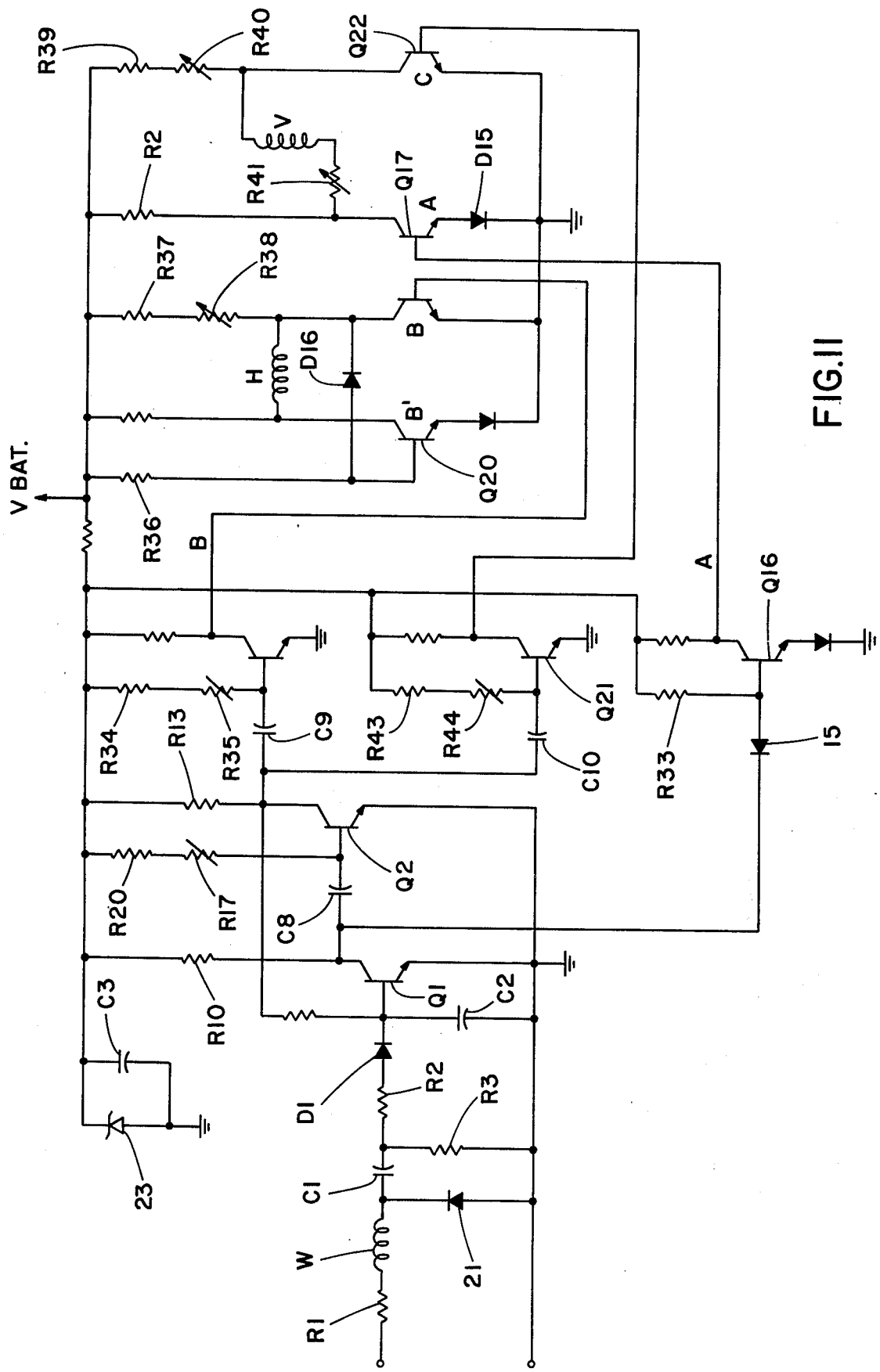
FIG. 11 is a circuit diagram of still another embodiment of the invention.

Still other embodiments of the invention may be provided. Thus, in FIG. 11 a form is shown which uses a resistor bridge for each of the coils H and V instead of the transistor bridge shown in the embodiment of FIG. 6. In FIG. 11 those elements which correspond to the elements of FIG. 6 have been given the same reference designations and their explanation will not be repeated. In this figure Q1, when it conducts in response to the receipt of an input pulse on its base, causes the transistor Q16, which is normally biased on through resistor R33, to stop conducting and accordingly its collector goes high producing the A pulse to turn on transistor Q17. As may be seen, Q17 is connected between the source and coil V through a diode D15 to ground. This causes a current to flow in the coil V in the negative direction for the duration of the A pulse.

Prior to the receipt of the repetitive pulse the transistor Q18, which produces the B pulse, is biased on through the resistors R34 and R35 so that the transistor Q19 is held off due to the low state of the collector Q18. At the same time the transistor Q20 is biased on through the resistor R36 and a negative current flows in coil H through the resistors R37 and R38. This condition exists before Q1 conducts so that the current flow in the coil H establishes a maximum negative current in the coil H and there is zero current in the coil V to thus produce the zero position as described. When Q1 conducts after a period of time, determined by the RC time constant including the resistors R34 and R35 and a capacitor C9, Q18 will conduct turning on Q19 to cause a current flow in the positive direction in the coil H. When Q19 conducts its collector going low is effective through the diode D16 to turn off the transistor Q20. The conduction of Q2 is also effective to turn on a transistor Q21 which produces the C pulse which is coupled to the transistor Q22 to cause a positive current in the coil V. As before, the positive current in the coil V during the C pulse is greater than the negative current for the negative current is held down by the resistors R39, R40 and R41 while the current in the positive direction is held down only by the resistors R42 and R41. The result is a net positive current in coil V. The duration of the C pulse is determined by an RC circuit including the resistors R43, R44 and the capacitor C10.

It is not believed necessary to repeat the complete description of the manner in which the A, B and C pulses are effective to control the average currents through the H and V coils for it is believed that this has been explained previously in connection with FIG. 6 and the same explanation applies with respect to FIG. 11.

While the specific embodiments show two and four coil arrangements and systems which generate three control pulses, the A, B and C pulses, it is possible to construct other arrangements. Thus, FIG. 12 illustrates a two pulse system used in conjunction with a three coil arrangement to produce rotation over 240°.

In this figure the repetitive input pulses from the wave shaper 200 causes pulse generator 201 to produce the A pulse immediately upon its receipt. A transistor 202 is normally maintained off with its collector high producing an A' pulse. As described previously, an RC circuit in 201 determines the end of the A pulse and the production of the B pulse by the pulse generator 203.

The coil arrangement consists of three coils 204, 205 and 206 disposed at 120° to each other with their center common connection supplied from a DC source. Transistors 207, 208 and 209 control the current or mmf of the coils 204, 205 and 206, respectively.

Initially with no pulse and 202 off transistor 209 is on permitting a current flow in coil 206. Transistors 207 and 208 are off so that a zero position is established as shown in FIG. 13. Upon the receipt of an input pulse the A pulse is produced by 201 and transistor 202 is turned on to turn 209 off. The A pulse turns on transistor 207 to cause a current flow in coil 204 for the duration of the A pulse. Following the production of the A pulse the B pulse is generated by 203 and the A' pulse once again appears. As the frequency of the input increases the duration of the A' pulse decreases resulting in less average current flow in coil 206 and greater average current flow in coils 204 and 205 so that the resultant magnetic vector rotates clockwise as shown in FIG. 13.

Thus, the current ratios in the 204, 205 and 206 coils shown in light solid lines produce the resultant magnetic vectors shown in the heavy solid lines at various positions. At 240° the input pulses occur at a frequency which precludes the generation of the B and A' pulses so that current is flowing only in coil 205 and a maximum rotation of 240° has been reached.

Variations other than those described may be devised which still remain within the scope of the invention as set forth in the claims.

What is claimed as new and desired to be secured by Letters Patent is:

1. In condition monitoring apparatus, a plurality of coils angularly positioned with respect to each other, means for supplying electrical energy to each of said coils, switching means connected to each coil to control the flow of current in the coil to which it is connected, means for receiving repetitive input pulses, the frequency of which represent a condition to be monitored, pulse generation means having a plurality of outputs connected to said pulse receiving means for producing different control pulses on each of said outputs in response to the receipt of a single input pulse and means connecting each of said switching means to a separate one of said outputs to enable said switching means in response to a control pulse to cause a current flow in the coil to which it is connected so as to produce a resultant magnetic field.

2. The aparatus of claim 1 in combination with a rotatable magnet and a pointer carried by said magnet.

3. The apparatus of claim 2 in combination with an indicia bearing dial whereby the value of the remote condition may be indicated.

4. The apparatus of claim 1 wherein said pulse generating means includes a plurality of pulse generators each producing a control pulse in response to the receipt of an input pulse.

5. The apparatus of claim 4 including means in said pulse generating means to return each of said pulse generators to their original state after the receipt of an input pulse.

6. The apparatus of claim 1 wherein a pair of coils positioned at right angles to each other are provided.

7. The apparatus of claim 6 wherein said pulse generating means includes three pulse generators producing three control pulses in response to the receipt of an input pulse.

8. The apparatus of claim 7 wherein a first of said pulse generators is connected to said pulse receiving means generates a first control pulse in response to the receipt of an input pulse, and includes first timing means for determining the duration of the first control pulse, the second and the third of said pulse generators are connected to said first of said pulse generators, said first timing means is connected to said second and third pulse generators to control their operation to cause said second and third pulse generators to begin the generation of second and third control pulses, and each of said second and third pulse generators including timing means effective to control the duration of the second and third control pulses.

9. The apparatus of claim 8 wherein said switch includes a first switching means connected to one coil to permit current flow in one direction when enabled, a second switching means connected to the other coil to permit current flow in one direction when enabled, a third switching means connected to said one coil to permit current flow in the other direction when enabled, and fourth switching means connected to said other coil to permit current flow in the other direction when enabled.

10. The apparatus of claim 9 wherein said first pulse generator is connected to said first switching means to enable it during said first control pulse; said second pulse generator is connected to said second switching means to enable it during said second control pulse; said third pulse generator is connected to said third switching means to enable it during said third control pulse; and said fourth switching means is connected to said second switching means whereby said fourth switching means is disenabled when said second switching means is enabled.

11. The apparatus of claim 10 wherein the timing means in said second pulse generator is effective to cause said second pulse generator to produce a second control pulse of a relatively short length and said timing means in said third pulse generator is effective to said third pulse generator to produce a third control pulse of a relatively long length compared to the length of said second control pulse.

12. The apparatus of claim 11 wherein said first and third switching means are each constituted by a pair of transistors and are connected to said one coil in a bridge configuration; said second switching means is constituted by a pair of transistors and said other coil is connected between the collector of one transistor and the emitter of the other; and fourth switching means is constituted by a transistor and said other coil is connected to the collector of said transistor.

13. The apparatus of claim 12 wherein the collector of one transistor in said second switching means is connected to the base of the transistor of said fourth switching means.

14. The apparatus of claim 13 including means to normally bias the transistor of said fourth switching means to a conductive state.

15. The apparatus of claim 11 wherein said first switching means is a transistor connected to one end of said one coil; said second switching means is a transistor connected to one end of said other coil; said third switch means is a transistor connected to the other end of said one coil; and said fourth switch means is a transistor connected to the other end of said other coil.

16. The apparatus of claim 15 wherein the collector of the transistor of said second switching means is connected to the base of the transistor of the transistor of said fourth switching means.

17. The apparatus of claim 16 including means to normally bias the transistor of said fourth switching means to a conductive state.

18. The apparatus of claim 11 wherein each of said timing means is constituted by an adjustable RC circuit and includes means for supplying the same adjustable voltage to each RC circuit to adjust the time intervals determined thereby proportionally.

19. The apparatus of claim 14 in combination with a rotatable magnet and pointer carried by said magnet.

20. The apparatus of claim 17 in combination with a rotatable magnet and a pointer carried by said magnet.

21. The apparatus of claim 1 wherein three coils are positioned 120° from each other and have a common connection at one end of each coil; and wherein said electrical energy supplying means is connected to said common connection.

22. The apparatus of claim 21 wherein said switching means comprises a first transistor connected between the free end of a first coil and ground, a second transistor connected between the first end of a second coil and ground and a third transistor connected between the free end of a third coil and ground.

23. The apparatus of claim 22 wherein said pulse generating means comprises first and second pulse generators for producing first and second control pulses, and includes further means for producing a control signal when said first control pulse is not present; means connecting said further means to said first transistor; means connecting said first pulse generator to said third transistor; and means connecting said second pulse generator to said first transistor.

24. The apparatus of claim 1 including first and second pairs of coils with said first pair positioned at right angles to said second pair, and means connecting one end of each coil to said electrical energy supply means.

25. The apparatus of claim 1 wherein said pulse generation means comprises a driven oscillator connected to said pulse receiving means to be driven thereby, and means responsive to the output of said oscillator for producing control pulses spaced in time and varying in length.

26. The apparatus of claim 25 wherein said last mentioned is constituted by a counter connected to the output of said driven oscillator, a plurality of dividers driven by the output of said counter and decoding means connected to the outputs of said dividers for producing the control pulses.

27. The apparatus of claim 26 including means for varying the counting rate of said counters.

28. The apparatus of claim 27 including first and second pairs of coils with said first pair positioned at right angles to said second pair and means connecting one end of each coil to said electrical energy supply means.

29. The apparatus of claim 27 wherein said switching means are connected between the free ends of said coils and ground.

30. The apparatus of claim 29 wherein the control pulse outputs of said decoding means are connected to said switching means.

31. The apparatus of claim 30 including means in said pulse receiving means for producing pulses at twice the frequency of the repetitive input signals.

* * * * *

UNITED STATES PATENT AND TRADEMARK OFFICE
CERTIFICATE OF CORRECTION

PATENT NO. : 3,946,311
DATED : March 23, 1976
INVENTOR(S) : John D. Baker and Bryce W. Carus It is certified that error appears in the above-identified patent and that said Letters Patent are hereby corrected as shown below:

Column 5, line 21, "positive" should be --connected--

Signed and Sealed this eighth Day of June 1976

[SEAL]

Attest:

RUTH C. MASON
Attesting Officer

C. MARSHALL DANN
Commissioner of Patents and Trademarks